(12) United States Patent
Kis

(10) Patent No.: US 12,233,709 B2
(45) Date of Patent: Feb. 25, 2025

(54) FUEL TYPE IDENTIFYING GAS CAP

(71) Applicant: Stephen Kis, Thunder Bay (CA)

(72) Inventor: Stephen Kis, Thunder Bay (CA)

(\*) Notice: Subject to any disclaimer, the term of this patent is extended or adjusted under 35 U.S.C. 154(b) by 0 days.

(21) Appl. No.: 17/661,119

(22) Filed: Apr. 28, 2022

(65) Prior Publication Data

US 2023/0347731 A1  Nov. 2, 2023

(51) Int. Cl.
*B60K 15/04* (2006.01)
*G09F 11/23* (2006.01)

(52) U.S. Cl.
CPC .......... *B60K 15/0406* (2013.01); *G09F 11/23* (2013.01)

(58) Field of Classification Search
CPC ..... G09F 11/23; B60K 15/0406; B65D 51/18; B65D 47/265
USPC ....... 220/288, 212.5, 212, 253, 259.3, 256.1
See application file for complete search history.

(56) References Cited

U.S. PATENT DOCUMENTS

| | | | | |
|---|---|---|---|---|
| 4,680,882 A | * | 7/1987 | Watson, Jr. | G09F 11/23 292/307 R |
| 2009/0025625 A1 | * | 1/2009 | Lee | G09F 11/23 116/223 |
| 2016/0125771 A1 | * | 5/2016 | Nazginov | G09F 11/23 116/308 |
| 2023/0264869 A1 | * | 8/2023 | Sibony | G06M 1/045 220/212 |

\* cited by examiner

*Primary Examiner* — Robert J Hicks
*Assistant Examiner* — Sanjidul Islam
(74) *Attorney, Agent, or Firm* — Orin Del Vecchio

(57) ABSTRACT

A fuel type identifying gas cap that is configured to being operably coupled to an opening of a gas can and provide identification of the fuel type and a fuel to oil ratio of the fuel disposed in the gas can. The present invention includes a body wherein the body includes a top portion. The top portion includes an inner dial member being configured to display the fuel to oil ratio of the fuel disposed in the gas can. An outer dial member is present and is configured to display the fuel type, specifically indicating the octane level. A center portion is present in the body that is releasably secured thereto. The center portion is configured to display the month and year of the fuel deposit into the gas can. Additionally, the center portion is releasably secured in order to facilitate an operable coupling with a spout.

10 Claims, 5 Drawing Sheets

FUEL TYPE IDENTIFYING GAS CAP

FIELD OF THE INVENTION

The present invention relates generally to gas caps for fuel cans, more specifically but not by way of limitation, a gas cap for a fuel can that is configured to provide identification of the type of gasoline currently disposed in the interior of the gas can.

BACKGROUND

As is known in the art, combustible engines operate on various types of fuels. Some engines due to their compression ratio require a higher percentage of octane in order to operate as intended. Additionally, there are two types of small combustible engines commonly known as four stroke and two stroke motors. The former is a conventional combustible engine that utilizes an oil pan and other elements to circulate oil through the block of the engine during operation thereof. The latter employs a specific fuel mix of gasoline and oil wherein the oil mixed with the gasoline provides the necessary lubrication of the internal components of the two stroke engine.

One issue with two stroke engines is the requirement for different ratios of gas to oil. Each type of two stroke engine typically comes with its own unique requirement of fuel blend that must be utilized to run the two stroke engine. By way of example but not limitation, some two stroke engines may require a 36:1 fuel to oil ration while others may require a 20:1 fuel to oil ratio. Many individuals own various pieces of equipment, motorbikes or similar items that require alternate fuel to oil ratios. The owner of these aforementioned items must ensure that they track what fuel blend is in a gas can to ensure the proper fuel is placed in the gas tank of the equipment or motor vehicle requiring a fuel blended with oil. This is rarely accomplished easily and many times the incorrect fuel is placed in the gas tank which results in damage to the engine.

Accordingly, there is a need for gas cap that is configured to be releasably secured to a conventional gas can wherein the gas cap of the present invention includes dial members configured to display the fuel to oil ratio.

SUMMARY OF THE INVENTION

It is the object of the present invention to provide a gas cap configured to be releasably secured to a gas can and operable to display the fuel to oil ratio of the fuel disposed in the gas can wherein the present invention includes a body that is manufactured of plastic or similar material.

Another object of the present invention is to provide a gas cap configured to provide the fuel to oil ratio of gas disposed in the gas can to which the gas cap is secured wherein the body includes a top portion having an inner dial member and an outer dial member.

A further object of the present invention is to provide a gas cap configured to be releasably secured to a gas can and operable to display the fuel to oil ratio of the fuel disposed in the gas can wherein the inner dial member further includes a view window.

Still another object of the present invention is to provide a gas cap configured to provide the fuel to oil ratio of gas disposed in the gas can to which the gas cap is secured that further includes a first indicia dial operably coupled with the inner dial member.

An additional object of the present invention is to provide a gas cap configured to be releasably secured to a gas can and operable to display the fuel to oil ratio of the fuel disposed in the gas can wherein the outer dial member further includes a view window.

Yet a further object of the present invention is to provide a gas cap configured to provide the fuel to oil ratio of gas disposed in the gas can to which the gas cap is secured that further includes a second indicia dial.

Another object of the present invention is to provide a gas cap configured to be releasably secured to a gas can and operable to display the fuel to oil ratio of the fuel disposed in the gas can wherein the first indicia dial is operable to provide a plurality of fuel to oil ratios.

Still another object of the present invention is to provide a gas cap configured to provide the fuel to oil ratio of gas disposed in the gas can to which the gas cap is secured that further includes a center portion having an adjustable calendar dial members mounted therein.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
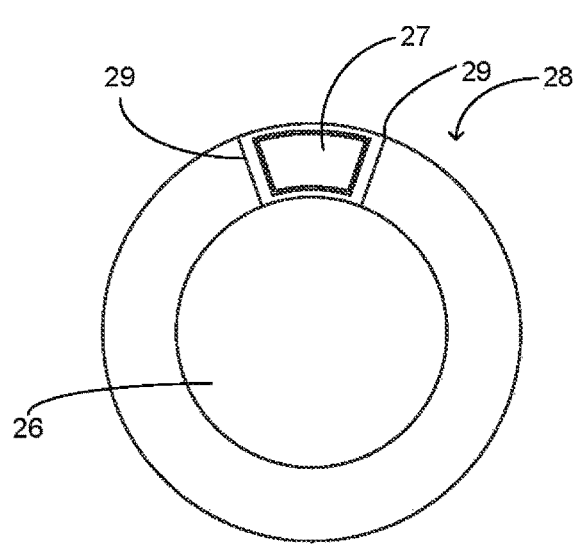
FIG. 1 is a top view of the inner dial member of the present invention.

Referring now to the drawings submitted herewith, wherein various elements depicted therein are not necessarily drawn to scale and wherein through the views and figures like elements are referenced with identical reference numerals, there is illustrated a fuel type identifying gas cap 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring in particular to the Figures submitted as a part hereof, the fuel type identifying gas cap 100 includes a body 10 wherein the body 10 is manufactured from a rigid fuel resistance material such as but not limited to plastic. The body 10 includes an annular shaped wall 8 and is substantially hollow intermediate the lower end 11 and upper end 7. The body 10 further includes integrally formed therewith a top portion 9 that is further discussed herein. The lower end 11 includes opening 12 wherein the opening 12 includes an inner wall having threads formed thereon (not particularly illustrated herein). The body 10 is configured to be threaded onto a conventional gas can 99. It should be understood that the body 10 could be provided in alternate sizes in order to be operably coupled to a gas can 99 of different capacities.

Figure 2:
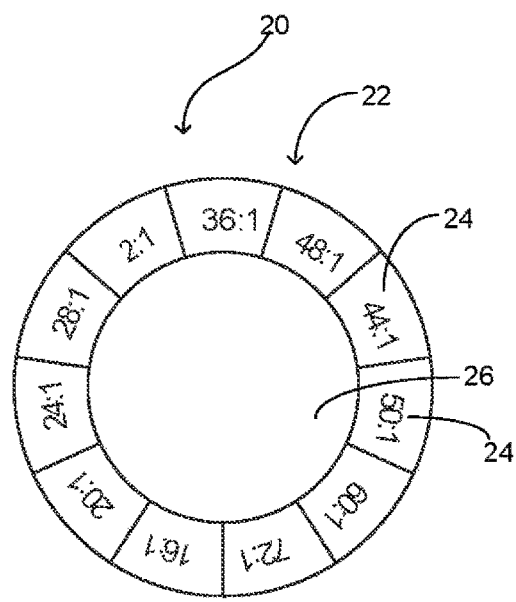
FIG. 2 is a top view of the first indicia dial of the present invention.
Figure 3:
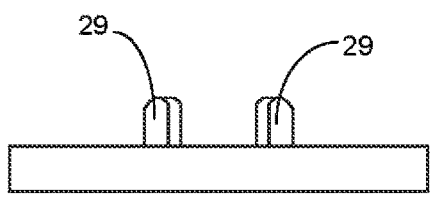
FIG. 3 is a side view of the inner dial member of the present invention.
Figure 4:
FIG. 4 is a side view of the first indicia dial of the present invention.
Figure 5:
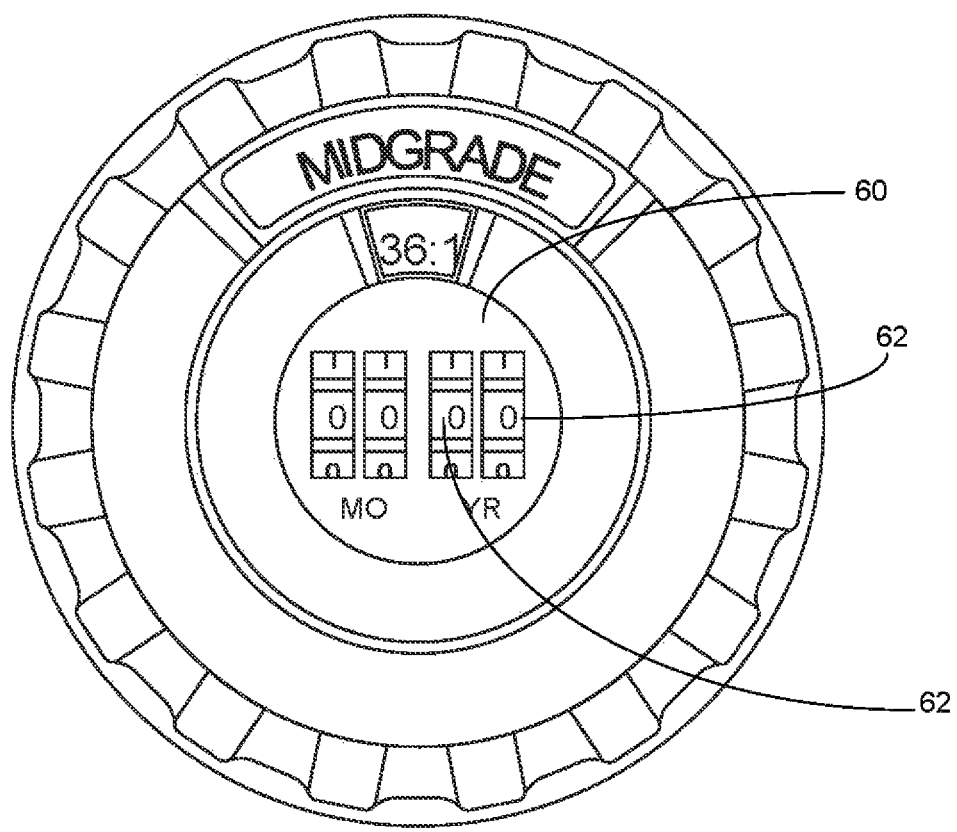
FIG. 5 is a top view of the present invention with the center portion present.
Figure 6:
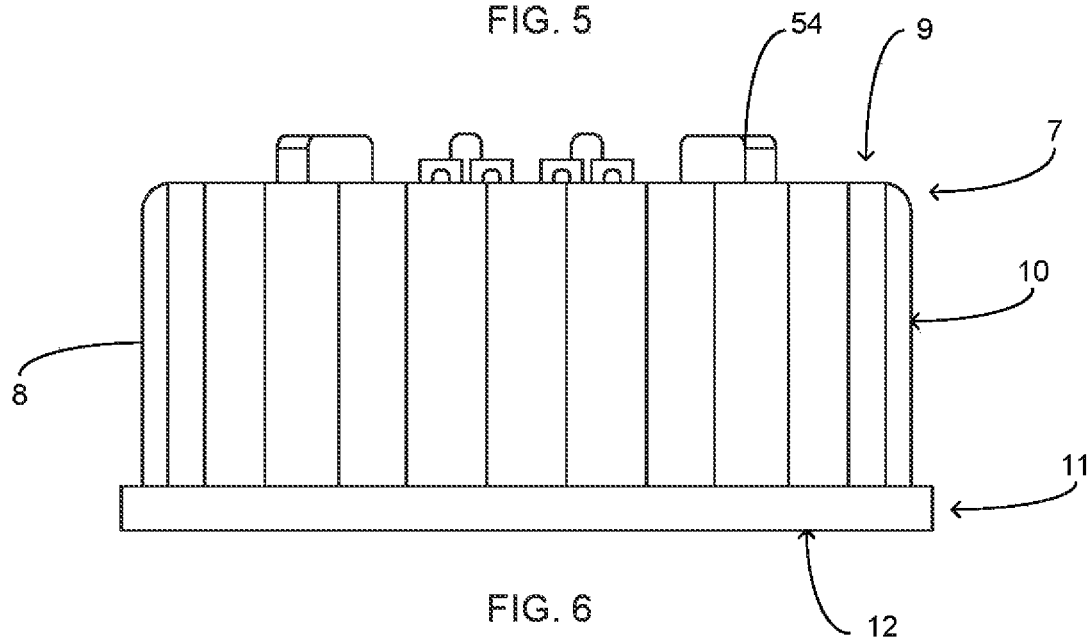
FIG. 6 is a side view of the present invention.

Referring now to FIGS. 1-4, the inner dial member 20 is illustrated therein. The inner dial member 20 is movably secured to the top portion 9 of the body 10. The inner dial member 20 comprises a first indicia dial member 22. The first indicia dial member 22 is manufactured from a rigid material such as but not limited to plastic. The first indicia dial member 22 is planar in manner and ring-shaped. A plurality of indicia segments 24 are present on the upper surface of the first indicia dial member 22. The indicia segments 24 include numerical fuel to oil ratios. These ratios provide a user of the fuel type identifying gas cap 100 to select therefrom wherein a user will select the appropriate ratio for the fuel that is currently disposed within the gas can 99. It should be understood within the scope of the present invention that the first indicia dial member 22 could have disposed thereon various quantities of indicia segments 24 and wherein the fuel to oil ratios could vary.

The inner dial member 20 further includes the first view dial member 28. The first view dial member 28 is ring-shaped having central aperture 26 and is manufactured from plastic or other suitable material. The first view dial member 28 is movably superposed the first indicia dial member 22. A view window 27 is formed in the first view dial member 28 wherein the size thereof is approximately equivalent to the indicia segments 24. Subsequent a fuel being disposed in the gas can 99, a user will move the first view dial member 28 so as to expose the indicia segment 24 displaying the fuel to oil ratio of the fuel now present in the gas can 99. The first view dial member 28 includes engagement tabs 29 which extend upward from the first view dial member 28 and are integrally formed therewith. The engagement tabs 29 provide an interface to rotatably move the first view dial member 28 to a desired position so as to display the correct fuel to oil ratio.

Figure 7:
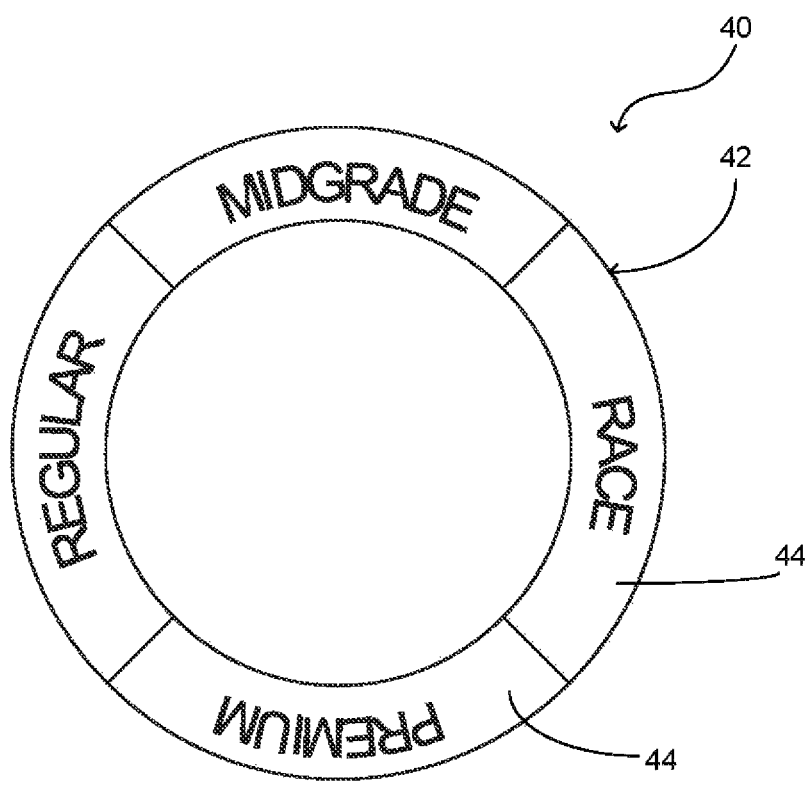
FIG. 7 is a top view of the second indicia dial of the present invention.
Figure 8:
FIG. 8 is a side view of the second indicia dial of the present invention.
Figure 9:
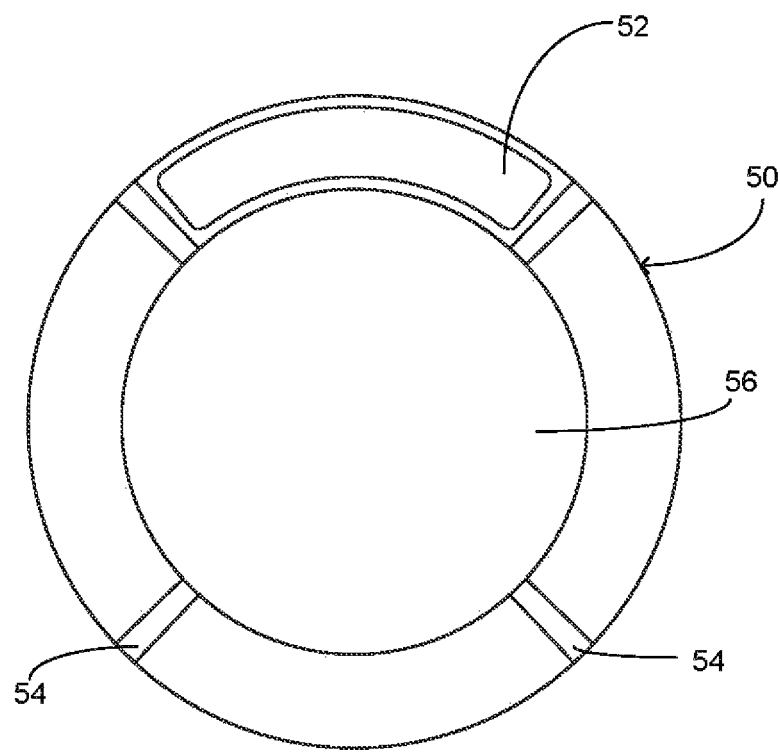
FIG. 9 is a top view of the outer dial member of the present invention.
Figure 10:
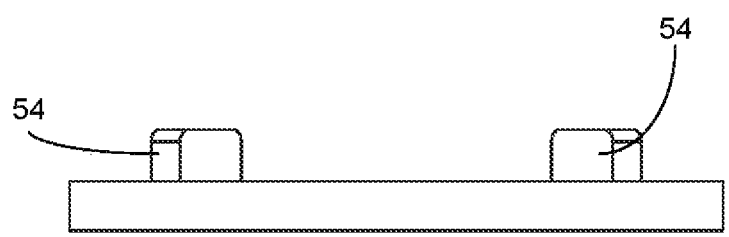
FIG. 10 is a side view of the outer dial member of the present invention.
Figure 11:
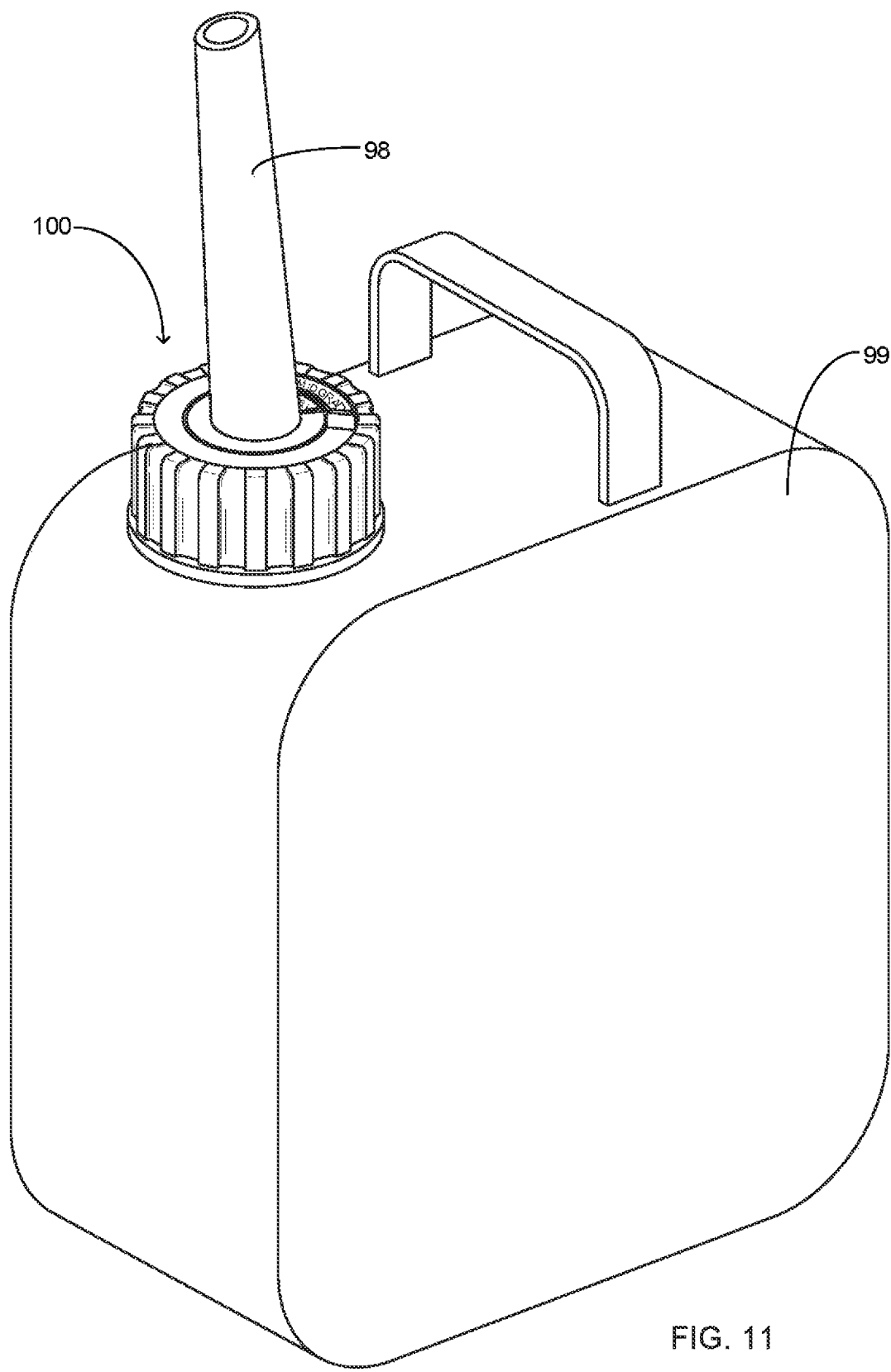
FIG. 11 is a perspective view of the present invention secured to an exemplary gas can.

Now referring to FIGS. 7 through 10 the fuel type identifying gas cap 100 includes an outer dial member 40 movably formed in the top portion 9 of the body 10. The outer dial member 40 is located adjacent to the inner dial member 20 having a diameter that is greater and as such being positioned exteriorly to the inner dial member 20. The outer dial member 40 includes a second indicia dial member 42 having indicia segments 44 formed on the upper surface thereof. The second indicia dial member 42 is ring-shaped and is manufactured from a rigid material such as but not limited to plastic. The indicia segments 44 include imprinted thereon indicia that indicates the octane level of the fuel that has been disposed within the gas can 99.

The second view dial member 50 is movably superposed the second indicia dial member 42. The second view dial member 50 is identical in size and shape to the second indicia dial member 42 and includes a view window 52. View window 52 is sized approximately equal to the indicia segments 44 so as to allow viewing thereof. The second indicia dial member 42 includes a plurality of engagement tabs 54 extending upward therefrom and being perpendicular thereto. The engagement tabs 54 provide an interface for a user to rotatably move the second view dial member 50 to a desired location so as to view the appropriate fuel type disposed within the gas can 99. The second view dial member 50 includes aperture 56 which is of sufficient size to accommodate the inner dial member 20 and the elements thereof.

The fuel type identifying gas cap 100 further includes a center portion 60. The center portion 60 is releasably secured within the aperture 26 on the top portion 9 of the body 10. The center portion 60 is annular in shape and is manufactured from a durable material such as but not limited to plastic. The center portion 60 is configured to be removable in order to accommodate operable coupling of the fuel type identifying gas cap 100 to spout 98. In use, the center portion 60 is removed so as to operably couple the spout 98 in order to dispense fuel from the gas can 99. Ensuing the dispensing of fuel the center portion 60 is replaced. The center portion 60 is configured to identify the month and the year in which the fuel disposed in the gas can 99 was placed therein. The center portion 60 includes a plurality of dial members 62 that are rotated in order to provide display of the month and year in which the fuel was deposited into the gas can 99. While the dial members 62 have been disclosed herein for displaying the month and year of fuel deposit, it is contemplated within the scope of the present invention that the center portion 60 could be alternatively configured in order to display the month and year of fuel deposit into the gas can 99.

While the fuel type identifying gas cap 100 has been disclosed herein as having an inner dial member 20 and an outer dial member 40, it should be understood within the scope of the present invention that the fuel type identifying gas cap 100 could utilize only a single dial member configured to display either a fuel type or fuel to oil ratio.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A fuel mixture identifying gas cap configured to be secured to a gas can wherein the fuel mixture identifying gas cap comprises:
    a body, said body having a wall being annular in shape, said body having an upper end and a lower end being hollow therebetween, said body having an opening at said lower end, said body having a top portion proximate said upper end;
    an inner dial member, said inner dial member being formed in said top portion of said body, said inner dial member having a first indicia dial member, said first indicia dial member having indicia segments on an upper surface thereof, said inner dial member further including a first view dial member, said first view dial member being movably superposed said first indicia dial member, said first view dial member further having a view window, said view window being approximately a same size as the indicia segments, said first view dial member being rotatably movable with respect to said first indicia dial member; and
    wherein said inner dial member is configured to provide data about a fuel that is disposed within the gas can.

2. The fuel mixture identifying gas cap configured to be secured to a gas can as recited in claim 1, and further including an outer dial member, said outer dial member being adjacent said inner dial member, said outer dial member configured to provide data regarding the fuel disposed within the gas can.

3. The fuel mixture identifying gas cap configured to be secured to a gas can as recited in claim 2, wherein said outer dial member having a second indicia dial member, said second indicia dial member having indicia segments on an upper surface thereof.

4. The fuel mixture identifying gas cap configured to be secured to a gas can as recited in claim 3, further comprising a second view dial member being movably superposed said second indicia dial member, said second view dial member further having a view window, said view window being approximately a same size as the indicia segments of said second indicia dial member.

5. The fuel mixture identifying gas cap configured to be secured to a gas can as recited in claim 4, and further including a center portion, said center portion being releasably secured within an aperture of said inner dial member, said center portion operable to be removed to accommodate a spout.

6. The fuel mixture identifying gas cap configured to be secured to a gas can as recited in claim 5, wherein said center portion further includes a plurality of dial members, said plurality of dial members configured to display a month and a year of a fuel deposit into the gas can.

7. A fuel mixture identifying gas cap that is operable to provide data parameters on fuel disposed in a gas can on which the fuel mixture identifying gas cap is secured wherein the fuel mixture identifying gas cap comprises:
    a body, said body having a wall being annular in shape, said body having an upper end and a lower end being hollow therebetween, said body having an opening at said lower end, said body having a top portion proximate said upper end;
    an inner dial member, said inner dial member being located in said top portion of said body, said inner dial member having a first indicia dial member, said first indicia dial member being ring shaped, said first indicia dial member having indicia segments on an upper surface thereof, said inner dial member further including a first view dial member, said first view dial member being movably superposed said first indicia dial member, said first view dial member being ring-shaped, said first view dial member further having a view window, said view window being approximately a same size as the indicia segments, said first view dial member being rotatably movable with respect to said first indicia dial member, said first indicia dial member configured to provide selections of fuel to oil ratios for a user to select therefrom and have displayed in said view window of the first view dial member;
    an outer dial member, said outer dial member being adjacent said inner dial member, said outer dial member being adjacent to and circumferentially surrounding the inner dial member, said outer dial member further including a second indicia dial member, said second indicia dial member being ring shaped, said second indicia dial member having an upper surface, said upper surface of said second indicia dial member having indicia segments thereon, said outer dial member further including a second view dial member, said view dial member being ring shaped, said second view dial member being movably superposed said second indicia dial member, said second view dial member having a view window, said view window of said second view dial member being sized equivalent to a size of said indicia segments of said second indicia dial member; and
    wherein said second indicia dial member is configured to display an octane rating of the fuel disposed in the gas can.

8. The fuel mixture identifying gas cap as recited in claim 7, and further including a center portion, said center portion being releasably secured within an aperture of said inner dial member, said center portion operable to be removed in order to have a spout placed within said aperture.

9. The fuel mixture identifying gas cap as recited in claim 8, wherein said center portion further includes a plurality of dial members, said plurality of dial members configured to display a month and a year of a fuel deposit into the gas can.

10. The fuel mixture identifying gas cap as recited in claim 9, and further including at least two engagement tabs, said at least two engagement tabs being secured to said outer dial member and said inner dial member, said at least two engagement tabs extending upward from said outer dial member and said inner dial member.

\* \* \* \* \*